April 24, 1962  R. GEDEIT  3,030,941
ROTARY ENGINES AND THE LIKE
Filed Dec. 15, 1958  9 Sheets-Sheet 1

Inventor:
Reinhold Gedeit

Inventor:
Reinhold Gedeit

April 24, 1962 R. GEDEIT 3,030,941
ROTARY ENGINES AND THE LIKE
Filed Dec. 15, 1958 9 Sheets-Sheet 3

Inventor:
Reinhold Gedeit

April 24, 1962 R. GEDEIT 3,030,941
ROTARY ENGINES AND THE LIKE
Filed Dec. 15, 1958 9 Sheets-Sheet 4

Inventor:
Reinhold Gedeit

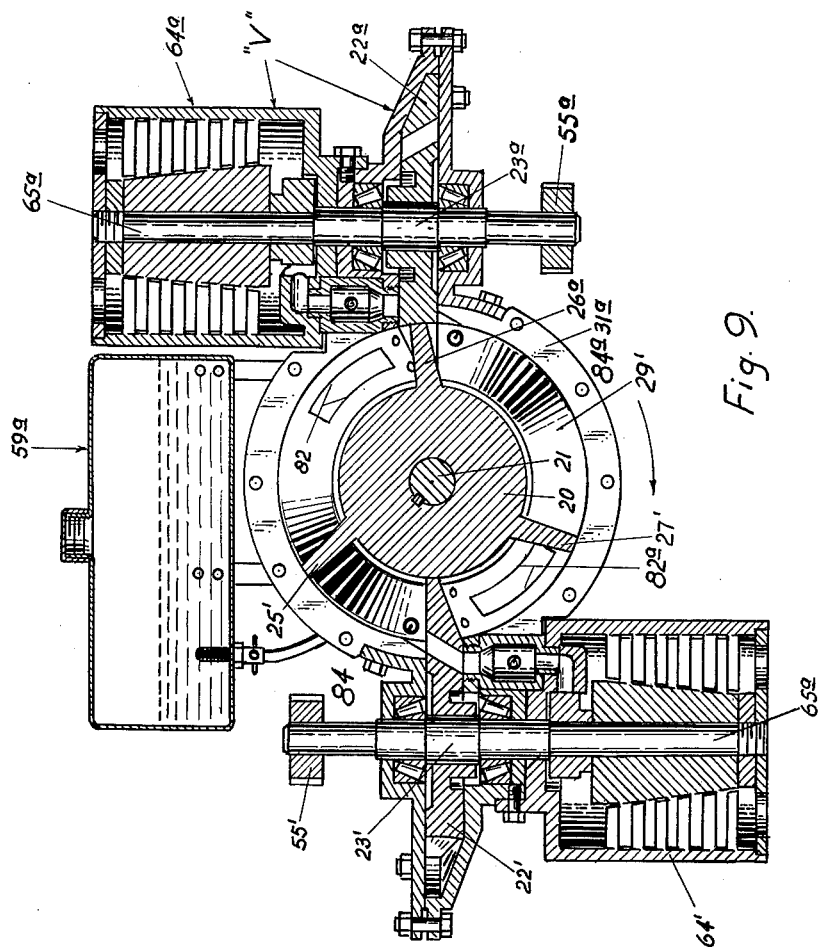

Inventor:
Reinhold Gedeit

April 24, 1962

R. GEDEIT 3,030,941

ROTARY ENGINES AND THE LIKE

Filed Dec. 15, 1958

Inventor:
Reinhold Gedeit,

April 24, 1962 R. GEDEIT 3,030,941
ROTARY ENGINES AND THE LIKE
Filed Dec. 15, 1958 9 Sheets-Sheet 9

Inventor:
Reinhold Gedeit

United States Patent Office 3,030,941
Patented Apr. 24, 1962

3,030,941
ROTARY ENGINES AND THE LIKE
Reinhold Gedeit, 3140 W. Pershing Road, Chicago, Ill.
Filed Dec. 15, 1958, Ser. No. 780,490
25 Claims. (Cl. 123—13)

This invention relates to improvements in rotary engines, and the like. The rotary engines herein disclosed are of the positive displacement type wherein the expansible motive fluid is contained in a closed chamber or chambers and exerts its driving force against a piston or blade connected to the driven shaft. Engines embodying the present invention may be operated either by steam, compressed air, or other previously compressed expansible media; or they may be of the internal combustion type. In the drawings to be described hereinafter I have shown a construction of the internal combustion type, but in so doing I wish it understood that I do not intend to limit myself to such specific type of embodiment, except as I may do so in the claims to follow.

One important object of the invention is to provide a positive displacement construction of engine wherein the need of using reciprocating or oscillating valves for control of the inlet and outlet ports is completely avoided. Valves of such type are highly objectionable when their use can be avoided, due, among other things, to the inertial effects which must be met and overcome in such valve arrangements. These inertial effects are increasingly objectionable as the rotary speeds of the engine are increased, and they, in effect, limit the cyclic speed at which such engines may be operated. Such limitations are imposed by vibrational effects produced by such elements and the practical inability to counteract such effects by balancing forces of the design incorporating such types of valves. Furthermore, increase of cyclic speed of such type of valve arrangements rapidly increases wear and tear, difficulty of maintenance, noise, and high upkeep, all at excessive costs of maintenance and operation.

One prime object of the present invention is to provide a design and construction in which truly rotary valve elements are combined with the rotary piston or reaction element in such manner that said elements coact with each other to produce the intended operations of inlet of the motive medium to the acting space, closing of the inlet opening, expansion or pressure drive against the reaction element under expanding volume chamber conditions, opening of the exhaust ports, and finally the closing of such exhaust ports preparatory to commencement of the next cycle of operations. The hereinafter disclosed design and construction is one in which two rotary elements, one a gateway element and the other a power element, are journalled on axes of rotation at such angles to each other that the planes in which such elements rotate (being planes normal to their respective axes) intersect each other, together with provision of means to cause such two elements to rotate in exact synchronism and cyclic relation to each other at all times; and wherein such two elements are designed and constructed with gateway openings so placed in their perimeters, and of such shape and design, that during the mutual rotations of the two elements proper gateway and sealing operations are produced between such two elements to provide the necessary expansible or moving blade spaces in the power element.

In connection with the foregoing object it is a further object to provide suitable means in connection with such two basic elements for introduction of the driving medium, either steam or compressed air, or proper mixtures for internal combustion operation, either on the two-cycle or the four-cycle, or the diesel or other type of operation, or injection type of operation; and for discharge of the expanded or work extracted media in proper cyclic fashion.

Preferably, but not necessarily, the two elements are journalled on axes extending at right-angles to each other, and which axes do not intersect but lie in parallel planes displaced from each other a distance to permit the proper design and construction for inter-operation of such two elements. Conveniently, but not necessarily, one such axis extends horizontally, and may be termed the power axis, and the other axis extends vertically and may be termed the gateway axis. Under such convenient form of design and operation the power medium may be conveniently delivered to the proper porting arrangements, and the exhaust may also be conveniently handled.

Conveniently, also, but not necessarily, the two shafts are interconnected by simple spiral or helical gears set to produce the exact cycling timing of the two elements with respect to each other. In this connection it is also noted that provision may be made, in the design, for production of several driving impulses during each rotation of the power element, with corresponding proper gateway synchronism produced by the gateway element. By such an arrangement the power output of the unit may be correspondingly multiplied without much if any increase in the overall dimensions and weight of the unit. Furthermore, by this type of design a much more uniform torque may be delivered at the power shaft, with corresponding benefits of various kinds.

In connection with the foregoing I have hereinafter disclosed and shall describe several embodiments of my present invention, each of which includes provision for production of several impulses per rotation of the power element and shaft. In two such embodiments I have shown provision for inlet of motive medium at one side only of the perimeter of the power element; in another embodiment I have shown provision for inlet of the motive medium alternately at locations diametrically opposed to each other. In this latter embodiment the driving impulses are produced alternately at opposite sides of the power element, with corresponding balancing effects in the operation of the unit. This embodiment thus exemplifies the possibility of producing a plurality of power impulses for each blade of the power element, during each rotation, with corresponding multiplication of the power output produced by the single power rotor element. Various other forms or embodiments of the features of my present invention will also suggest themselves to the designer or student of the present specification, and I include all such other forms of embodiment within the scope of my present invention, as hereinafter defined in the claims.

With the foregoing in mind it may also be stated that an important object and feature of my present invention is to provide a power unit which may be dynamically balanced in all of its rotating parts, so that operations at high rotative speeds may be attained without excessive vibrations. In fact, units embodying the presently to be disclosed features and elements may be operated at such high rotative speeds as twenty thousand rotations of the gateway element per minute, with correspondingly large or high frequency of driving impulses delivered to the power shaft. Such speeds are, however, stated merely by way of illustration. However, as is well known, high frequencies of power impulses enable production of high weight economies in the design and construction of the units.

A further feature and object of the invention relates to the provision of a simple and compact construction of compressor for compressing the air fed to the combustion chambers when the invention is incorporated in an internal combustion type of engine design. In this and other connections the following statement is pertinent:

When the working or power element includes more than one drive blade (three are shown in each of the embodiments to be presently described) it is necessary to drive the gateway element and shaft at a rotary speed proportional to that of the power element in the ratio of the number of blades carried by such power element divided by the number of gateways provided in such gateway element. In each of the herein illustrated embodiments each power element is provided with three blades and each gateway element is provided with one gateway. Thus in each illustrated embodiment the ratio of rotative speed of gateway element compared to rotative speed of power element is three to one. Thus in each illustrated embodiment the gateway element and shaft rotate at a correspondingly higher angular rate than the power element and shaft. By attaching a centrifugal compressor (preferably of several stages) directly to the gateway element shaft it is possible to attain the desired degree of compression by such a rotary centrifugal compressor in very simple manner and with a very simple design and form of construction. In the illustrated designs I have shown five stage compressors directly attached to the gateway shafts of such designs. This arrangement also enables delivery of the compressed air or other gaseous medium directly to the compression or combustion chamber served by such compressor, with very short and simple passage forms.

I wish to point out, however, that I do not intend to limit the features of the present invention to embodiments in which a compressor is integrated with the other elements of the unit, except as I may do so in the claims to follow since it will become evident that any suitable supply of the compressed air or other medium may be connected to the proper gas inlet for supply of such medium to the working elements of the power element.

Another feature of the invention concerns itself with the provision of a construction which lends itself admirably to designs and constructions of prime movers in which it is desired to obtain high compression ratios of the gases at the commencement of each working stroke or impulse. Such ratios are presently being used of the order of ten to one or higher. The obtaining of such high compression ratios in conventional reciprocating piston type engines entails very close clearances of such reciprocating pistons with respect to the cylinder heads and requires that provision be made to accommodate the firing plugs or corresponding elements within such small clearance spaces.

It is an important feature of my present invention that I have provided a compression and combustion chamber in close proximity to each gateway element or power element at the location where the gateway or each gateway of such gateway element comes into position to allow passage of a blade of the power rotor through the gateway. Port arrangements are then provided of very short and direct form in the gateway element to deliver the compressed gaseous medium from the compression and/or combustion chamber to the proper space within the power rotor element. The arrangement is such that as each power rotor blade passes through a gateway of the gateway element then in service, and as the gateway element or the power element then rotates a small angular distance to seal the space behind the retreating blade in question, the small space thus established between such retreating blade and the surface of the rotating gateway element is at once connected to the compression and/or combustion chamber by such port of the gateway or of the power element.

Provision is also made for firing the charge thus contained in the combustion chamber and the short passage and port delivering therefrom to the space between the surface of the gateway element and the blade which is retreating from such gateway element. Such firing may be effected by a suitable ignition element such as a "hot" wire or a spark plug contained in the combustion and/or compression chamber. In such case the firing may be timed to actually occur slightly before the short passage and port leading to the power element has come into registry with the compression and/or combustion chamber and with the space between the surface of the gateway element and the retreating blade of the power element. Under such arrangement, as soon as such registry of the short passage and port occurs the high pressure-hot gases will burst through such valve port and act at once to build up full working pressure in the space which includes that space between the surface of the gateway element and the retreating blade, as well as the space in the short passage and the combustion and/or compression chamber. Such total space will then continue to expand until the gateway element has moved angularly far enough to carry the port or ports away from the location of registry with the compression and/or combustion chamber and the space behind the retreating rotor blade. Then the space between the surface of the gateway element and the retreating blade will expand until completion of the expansion phase of the cycle then in effect.

In connection with the foregoing explained operations I have provided means to supply to said combustion chamber the components of the intended combustion. Usually these will comprise compressed air and liquid fuel. The compressor already mentioned, or other suitable source of compressed air, may be used to supply the compressed air. I have provided a fuel pump to deliver the liquid fuel to the combustion chamber or chambers such pump being conveniently driven by the power shaft of the power rotor with provision of delivery of such fuel to the combustion chamber either continuously or by controlled and properly timed jets, according to conventional practice.

I have provided valve means to control communication of the source of compressed air, such as the compressor, with the compresssion and/or combustion chamber. Said valve means is timed to allow delivery of the compressed air to such chamber while said chamber is sealed off from the power rotor blade element by the gateway element or the power rotor itself, and to seal off communication between the compressor or other source of compressed air supply, to the compression and/or combustion chamber not later than the establishment of communication from such chamber to the space behind the retreating blade of the power rotor. Thus, when the liquid fuel is delivered into such chamber it immediately meets an ample supply of compressed air to sustain the combustion. If the compression is sufficient to raise the temperature of the compressed air to the ignition point, combustion and burning will commence and continue during the fuel injection interval on the diesel principle. This may then continue to a time after communication has been established between the combustion chamber and the space between the retreating blade and the gateway element, provided the port or ports of such gateway element provide such extended interval of such communication. Such a prolonged time of combustion may also be produced in the case of ignition by the "hot" wire or spark plug means.

In some cases it may be desired to initiate combustion directly in the space between the retreating blade and the surface of the gateway element after such gateway element has advanced to its gate closing position to seal off the space between the retreating blade and the surface of the gateway element, thus trapping a body of combustible mixture in such space. I have therefore, as a modification or as a supplement to the previously explained arrangements, shown a spark plug or other ignition means in direct communication with such space. Either or both of such ignition arrangements may be provided and used as desired, within the scope of the protection to be afforded by the claims to follow.

It will be seen that I have provided the rotating and bladed power element and the rotating gateway element, both of which elements rotate on axes contained in parallel but spaced apart planes, and both of which axes of rotation are non-parallel to each other. Insofar as concerns the compression and/or combustion chamber and the port and valve means for controlling communication from such chamber to the space between the retreating power element blade and the surface of the gateway element, I have previously referred to an arrangement in which such gateway element also serves as a valving element to control valving between the compression and/or combustion chamber and the space between the retreating blade of the power element and the said chamber. I have also herein illustrated and shall describe an alternative construction in which the valving functions just referred to are divorced from the gateway element and are provided in or in connection with the power rotor itself. In such an embodiment the gateway element may nevertheless produce the desired valving operations by which the delivery of the compressed air or other gaseous medium to the compression and/or combustion chamber is controlled.

A further feature of the invention concerns itself with the provision of means to cool the power rotor parts (and other parts including the gateway and abutment disk) sufficiently to conform to desired or needed temperature limitations for such a prime mover as is herein disclosed. Specifically, such means includes arrangements for delivering cooling fluid, either air or water or other liquid or gas, directly against the front or leading surfaces of the power rotor blades or closely associated elements, opposite to the working chambers where the combustion is occurring, being locations not at the time of such deliveries in communication with the working spaces wherein power expansion is occurring. Such cooling media are then delivered through the exhaust port or ports at proper times and prior to travel of the blade thus treated to its working pressure position. I have also provided means to deliver such cooling media against the bottom face of the gateway and abutment disk opposite to the location where the top face of such disk is subjected to the high heat of the burning mixture, to thus prevent the peripheral portion of such disk from being overheated.

Other objects and uses of the invention concern themselves with the provision of a very simple design of parts mechanically, lending themselves to ready and convenient construction and fabrication by conventional shop practices and to a high degree of accuracy and tolerance of production. Also, to the provision of a design which lends itself to production on quantity basis at low costs of manufacture and small labor time.

In connection with the foregoing it is a further object to produce a design and construction of such character that close tolerances may be used between moving parts, and without excessive trouble due to temperature effects. These features will make it possible to eliminate sealing rings and like elements conventionally employed to avoid gas leakages past moving elements which are subject to considerable pressure differentials. The design is also one which can be readily lubricated at points needing such treatments and protection. Specifically, in this connection I have formed the working or power blades of quadrilateral or trapezoidal form when viewed in the direction tangent to the circle of rotation, the side edges of such blades preferably but not necessarily being straight and slanting towards each other; and the housing or annular chamber wherein said blades rotate is provided with annular circular sidewalls against the surfaces of which the edges of the blades travel.

Other objects and uses of the invention will appear from a detailed description of the same, which consists in the features of construction and combinations of parts hereinafter described and claimed.

In the drawings:

FIGURE 1 shows a front elevation of a unit embodying the features of my present invention, being a "single-sided" unit designed to produce three power impulses per revolution of the power shaft, and being provided with a single gateway element on one side of the power unit, with a gear ratio of three to one between the gateway element and the power shaft; thus driving the gateway element at three times the speed of the power element; and in this embodiment the gateway element also serves as a valving element between the compression and/or combustion chamber and the power rotor element;

Figure 2:
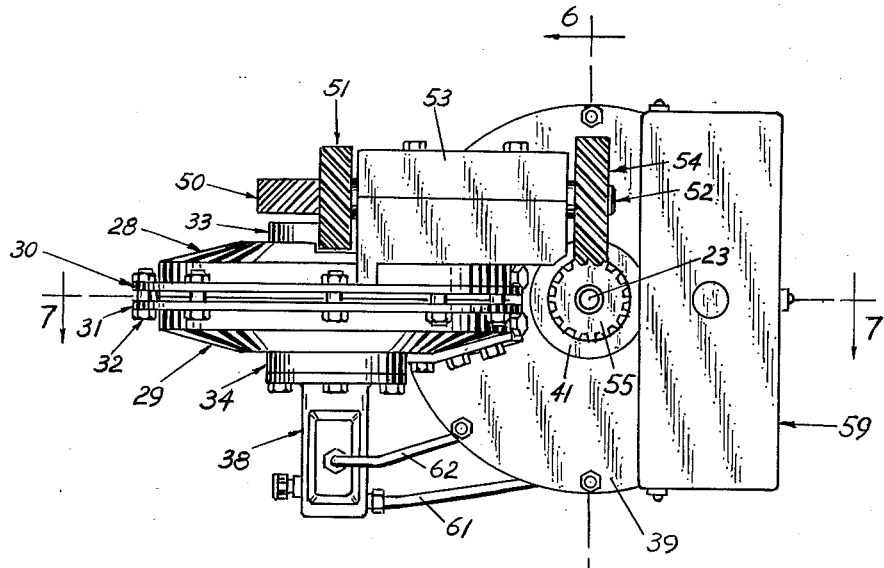
FIGURE 2 shows a top or plan view corresponding to FIGURE 1.
Figure 1:
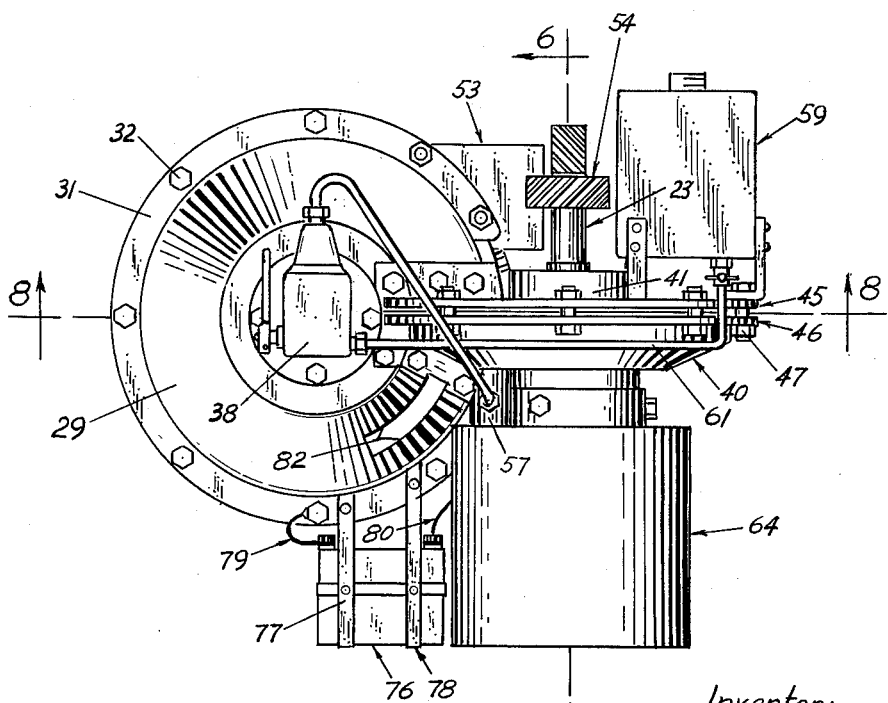
Figure 6:
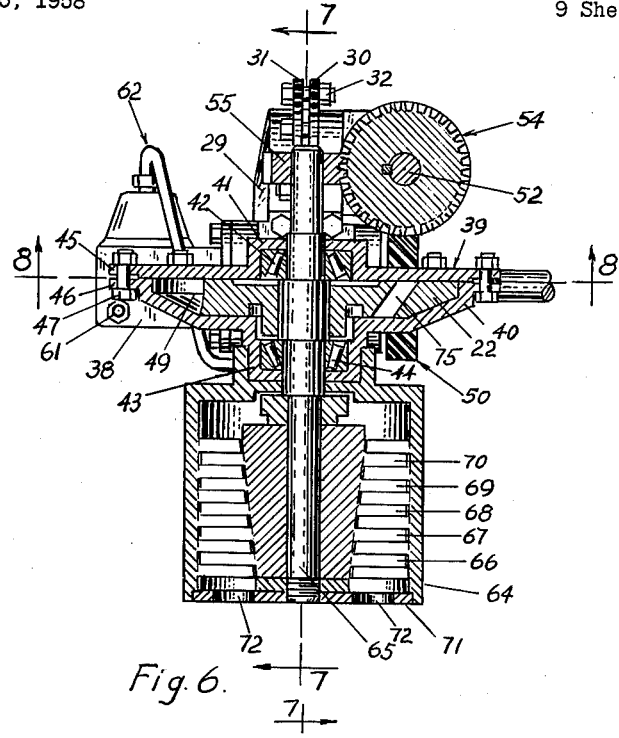
FIGURE 6 shows a vertical cross-section taken on the lines 6—6 of FIGURES 1, 2, 3, 4, 7 and 8, looking in the direction of the arrows; and may also be considered as a similar cross-section through one of the gateway elements of the embodiment shown in FIGURE 9.
Figure 7:
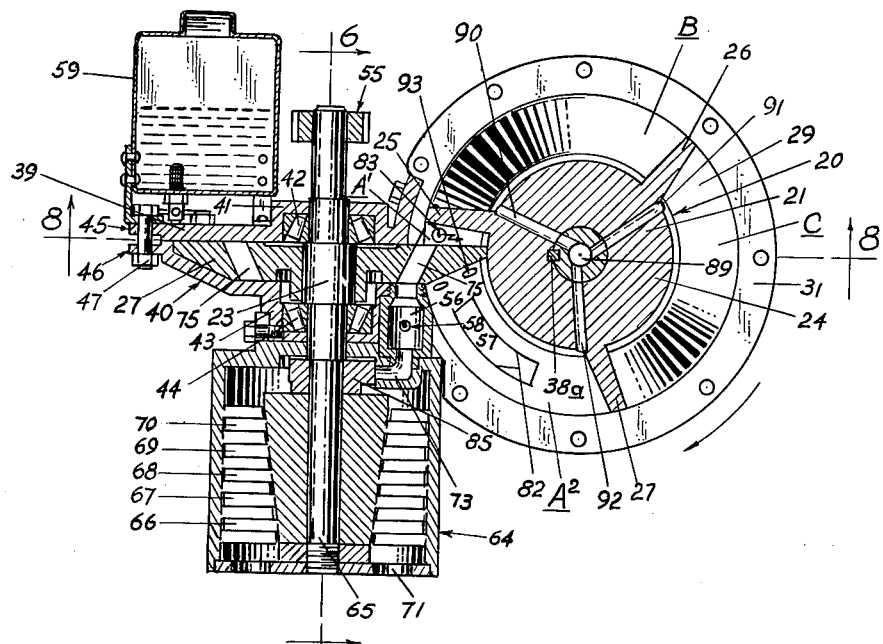
FIGURE 7 shows a vertical longitudinal section taken on the lines 7—7 of FIGURES 2, 4, 5, 6 and 8, looking in the directions of the arrows; and may also be considered as a similar section through one of the gateway elements of the embodiments shown in FIGURE 9.
Figure 8:
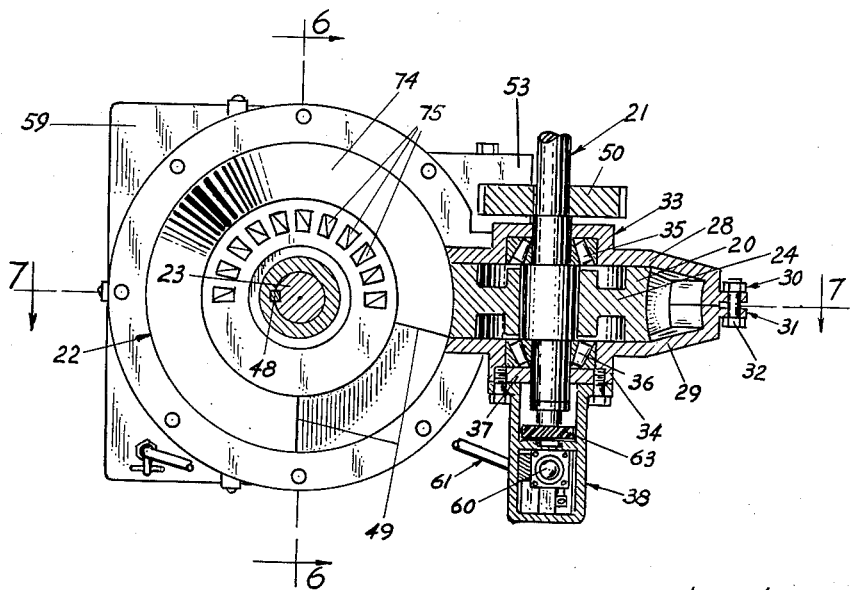
Figure 11:
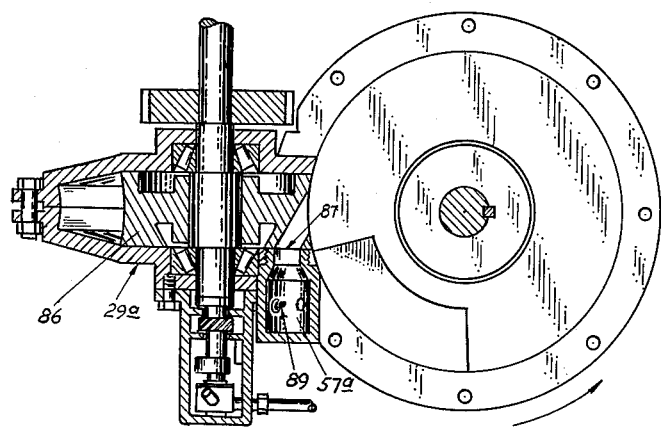
Figure 10:
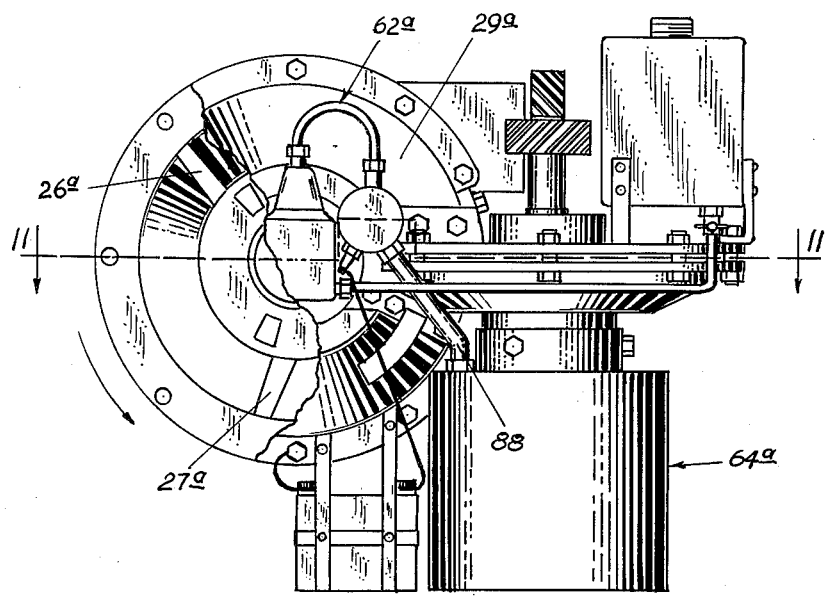
Figure 12:
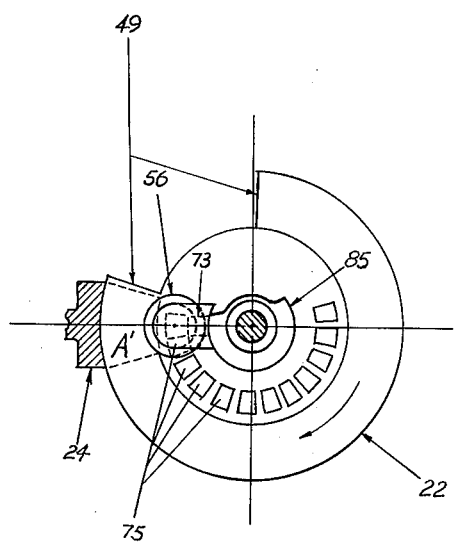
Figure 13:
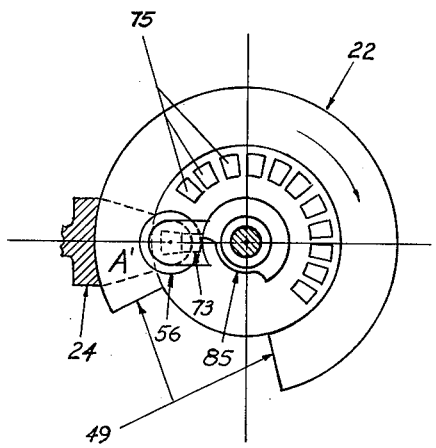
Figure 14:
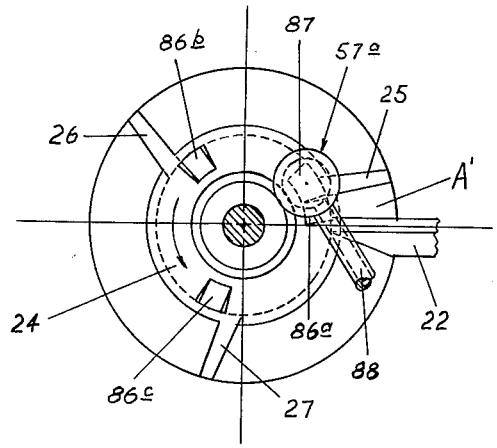
Figure 15:
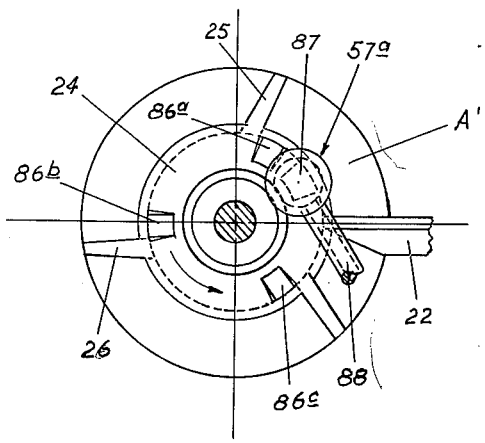
Figure 16:
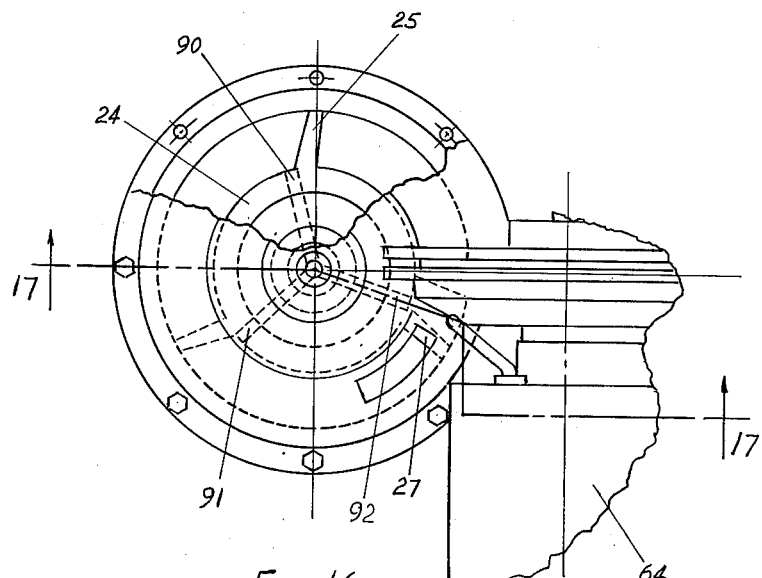
Figure 17:
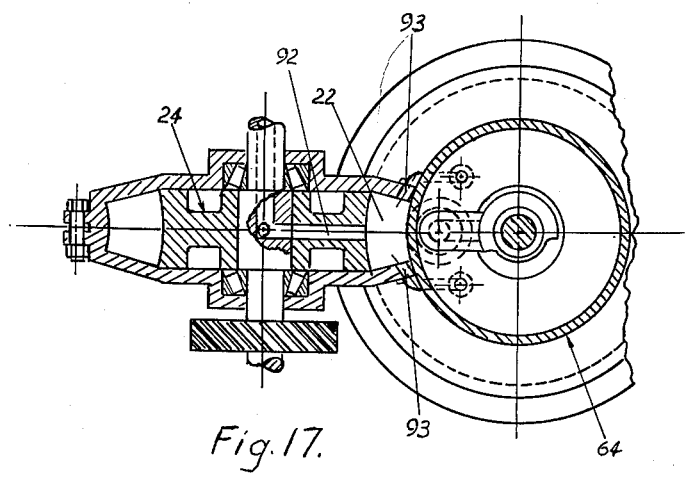

FIGURE 8 shows an irregular section taken on the lines 8—8 of FIGURES 1, 3, 6 and 7, looking upwardly in the directions of the arrows, being a horizontal section; and it shows the gateway element rotated to position to just seal off the working chamber or space of the power element, the blade of which element has just risen slightly above the upper surface of the rotary gateway element, as shown in FIGURE 7 where the power rotor rotates clockwise, the ports of the rotary gateway element just beginning to come into registry with the working chamber above referred to, to permit delivery of a working charge of mixture to the space of the power rotor blade which has thus moved to a location above the surface of the gateway element, it being remembered that the gateway element rotates at three times the angular velocity of the power rotor element; and this figure may also be considered as being a similar section taken on one of the gateway elements of the embodiment shown in FIGURE 9;

FIGURE 9 shows a vertical longitudinal section similar to that of FIGURE 7, but showing the "two-sided" embodiment, including one of the gateway elements at each side of the power element, one such gateway element being inverted with respect to the other gateway element due to the desire for regularity of design and also the fact that the power rotor is moving downwardly at the second side of the unit;

FIGURE 10 shows a front elevation of another construction embodying features of my present invention; and in this embodiment I have provided the compression and/or combustion chamber at the front face of the power rotor casing, and said power rotor casing is ported to establish communication between the compression and/or combustion chamber and each of the working spaces between the successive blades of the power rotor in turn, with proper cut-off of such communication at the proper angular position of each such working space of the power rotor after which further expansion of the gases within such space may occur as the blade continues its retreat from the surface of the gateway element and until the gateway comes into registry with the path of the next oncoming blade;

FIGURE 11 shows a horizontal section taken on the line 11—11 of FIGURE 10, looking in the direction of the arrows;

FIGURES 12 and 13 are partial horizontal sections taken substantially on the line 8—8 of FIGURE 7, looking upwardly, in the direction of the arrows; and these figures supplement the showing of FIGURE 7, showing the valving disk element in two successive rotated positions; and these figures also show the corresponding successive rotated positions of the cam element which serves to valve the supply passage for supply of air or other fluid medium to the combustion chamber;

FIGURES 14 and 15 are fragmentary elevational views looking at the face of the power rotor of the embodiment of FIGURES 10 and 11, the power rotor housing being removed; but these figures show the cylindrical combustion chamber in its relation to such power rotor element in order to show the relation of the gas supply passages of the rotor to the supply port of such combustion chamber and also in relation to the rotary valving element; and these FIGURES 14 and 15 should be read in connection with the showings of FIGURES 10 and 11;

FIGURE 16 shows a fragmentary elevation similar to the showing of FIGURE 1, but with certain elements broken away; and this figure shows the air supply connections for supplying cooling air to the under face of the edge portion of the gateway element at the location where it is desirable to cool said edge portion; and FIGURE 17 shows a section on the line 17—17 of FIGURE 16, looking upwardly; and this figure shows how the cooling air supplied by the connections shown in FIGURE 16 will reach the undersurface of the edge of the valving disk.

Referring first to FIGURES 7 and 8, the present unit includes the rotary bladed power element 20 carried by the horizontal shaft 21, and the gateway element 22 carried by the vertical shaft 23. These two shafts are journalled in the casings to be presently described.

The bladed power element 20 includes the hub portion 24 from which radiate the three blades 25, 26 and 27 (in the embodiment now being described), such blades being spaced 120 degrees from each other. The power element casing includes the two companion sections 28 and 29 of generally cup-shape, having the edge flanges 30 and 31 which are secured together conveniently by the bolts 32. Conveniently these casing elements are of tapered depth as well shown in FIGURES 2, 4, 5 and 8; and the blades are of corresponding contour so that each blade will travel with a nice clearance within the casing. It is here noted that the hub portion 24 is of width to meet the central portions of the casing elements, so that substantially gas tight chambers are produced with perimeters which comprise the hub porton 24, the proximate blade surfaces, and the inner surfaces of the companion casing elements.

The shape of each blade when viewed in a direction tangent to the axis of rotation of the power element 20, as shown at the right-hand portion of FIGURE 8, is generally trapezoidal, the side edges of the blades slanting radially outwardly and towards each other, and the smaller and larger radius edges of the blade being formed on circular arcs. The circular arc at the inner edge of the blade is defined by the circular arc of the hub portion 24, being the curvature of the outer perimeter of the edge flange of the valving element.

The central portions of the casing elements are provided with outwardly extending cups 33 and 34, respectively, within which are seated roller thrust bearings 35 and 36, the central portion of the shaft 21 being shouldered as well shown in FIGURE 8, to bear against the inner raceways of the respective roller bearings. The outer raceway of the bearing 35 is seated against the inner face of the casing cup 33. The outer raceway of the bearing 36 is seated against a spacer plate or series of shims 37 by which, when the two casing elements are drawn together, the shaft is accurately spaced and retained against endwise shift with respect to the casing, a cup-shaped element 38 being seated over the proximate end of the shaft and secured to the casing as shown in FIGURE 8. This cup-shaped element is so formed as to provide an inwardly facing seat against which the spacer plate or shims 37 will bear. By use of shims (not shown) exact seating of the outer raceway of the bearing 36 may be ensured, so that the shaft will be retained against endwise shift after being accurately located endwise.

The hub portion 24 of the rotor of the power element is preferably set onto the central portion of the shaft with a press or drive fit so that it cannot shift endwise on the shaft. Also, a key 38ª is provided to lock the hub 24 against angular shift on the shaft. If desired annular shims may be set between the casing flanges 30 and 31 to exactly space said casing sections after the rotor element has been set between them, and to ensure exact but close tolerance fit of the rotor blades with respect to the interior of the casing.

The gateway element rotor 22 is contained within a housing or casing including the top and bottom sections 39 and 40. Conveniently such gateway rotor element is formed with a flat top surface and a truncated conical lower surface as shown in FIGURES 6 and 7. The two casing elements are then formed of corresponding or appropriate contour. The rotor shaft 23 is journalled in these casing sections. To this end the top section 39 is formed with a central upstanding recess 41 to receive the upper roller thrust bearing 42; and the lower casing section 40 is formed with a downwardly extending neck 43 to receive the lower roller thrust bearing 44. The rotor shaft 23 is provided with the oppositely facing shoulders against which the inner raceways of these thrust bearings seat to thus retain the shaft against vertical shift. The outer raceway of the upper bearing 42 seats against the end of the cup recess 41; and conveniently the downwardly extending neck 43 is provided with a bottom flange against which the outer raceway of the lower bearing 44 seats, the shaft extending through such flange to the air or gas compressor presently to be described.

The peripheral portions of the rotor casing elements 39 and 40 are provided with peripheral flanges 45 and 46 which are secured together by the bolts 47 or otherwise. In so doing annular shims may be set between these flanges to ensure proper spacing of the two casing elements, and to ensure close but sure tolerances between the upper and lower rotor faces of the rotor and the proximate surfaces of the casing elements. The hub portion of the gateway rotor disk is keyed to the vertical shaft by the key 48 as shown in FIGURE 8 and elsewhere.

The rotor disk 22 is provided with an arcuate gateway opening 49 (see FIGURE 8) of angular embracement sufficient to allow passage of a blade of the power rotor and to also take care of that amount of rotation of the gateway disk which will occur during the passage of the power blade through such gateway. Such a condition and proportioning of parts is substantially shown in FIGURE 8. Additionally, the two shafts are located in parallel planes laterally separated from each other an amount equal to the radius of the gateway rotor element plus the radius of the hub 24 of the power element. As shown in FIGURE 8 such hub element 24 is also formed with an outer peripheral surface in the form of a solid of revolution of curvature to exactly receive the peripheral edge of the gateway rotor, as shown in FIGURE 8. Thus both the power rotor and the gateway rotor may rotate with the edge of the gateway rotor continuously in sealing engagement with the hub of the power rotor, except for that angular rotation of the two elements during which the blades pass through the gateway. It is here noted that since there is but one gateway in the gateway rotor shown in the several figures, while there are three blades on each of the illustrated power rotors, such gateway rotor should execute three rotations for each rotation of the power rotor. This relation will be referred to further hereinafter. The desired relation of rotative speed of gateway element compared to rotative speed of the power element is secured as follows:

Referring to FIGURES 1, 2, 3, 4, 5 and 6, the projecting end portion of the power shaft 21 is provided with the spiral or helical gear 50 which meshes with a companion gear 51 secured to the back shaft 52 which is journalled in a housing 53 secured to the power element casing 28. Such shaft 52 extends far enough to the left (when viewed as in FIGURE 3) to receive a spiral or helical gear element 54 which in turn matches with a companion gear element 55 secured to the upper portion of the vertical shaft 23. This gear train is so proportioned that the gateway element 22 is driven three times as fast as the power element, including its shaft and the blades. Thus the gateway 49 is brought into proper phasing with respect to the oncoming blades of the power rotor to ensure passage of each blade with immediate closing of the space defined by the gateway element at a location beneath such just passed blade. Thus as each blade of the power rotor is passed through the gateway of the rotor, such gateway rotor closes the space of the power element defined by the hub of such power rotor, the two casing elements 28 and 29, the trailing face of the so-passed blade, and the upper surface of the gateway element. Then, as the power shaft 21 and hub 24 continue to rotate (being driven by the expansion of the gas or other medium contained between the trailing face of the blade and the top face of the gateway rotor element 22), proper reactive forces are established between the blade and the top surface of the gateway element to ensure the intended production of torque and drive of the power rotor.

The lower section 40 of the casing which houses the gateway element is provided with a chamber 56 which may conveniently be called a "combustion" chamber. Conveniently this combustion chamber is formed in a unit 57 threaded up into the lower casing section 40 and through such section to establish communication with the bottom face of the gateway element 22. The gaseous medium such as air is supplied under proper pressure to the lower end of this chamber 56 by means to be presently described—in the present instance, a five stage centrifugal compressor. The combustible medium, either liquid or otherwise, is supplied to such chamber 56 to there mix with the supplied air. In the present case I have shown a small port 58 leading into such chamber 56, and through which liquid fuel, such as gasoline, oil, or other suitable hydrocarbon or other fuel, may be delivered into such chamber. Such delivery may be either substantially continuous, or as small jets delivered by a suitable jet injection pump according to conventional operations. To effect such latter form of fuel delivery I have shown the following elements:

A fuel supply tank 59 is mounted to a convenient portion of the structure, such as the top element 39 of the gateway casing. This tank supplies by gravity feed, the fuel to a small pump 60 carried in the element 38 at the front end of the power element casing element 29, and the fuel is supplied from such tank to the pump through the tube 61 (see FIGURES 1, 2 and 4). The delivered fuel, either as a small continuous stream or as a jet, is delivered through the line 62 to the port 58 of the combustion chamber.

The pump 60 is conveniently driven from the power element shaft 21 or an extension thereof, by a small spiral gear 63 carried by such shaft extension, as shown in FIGURE 8.

In the embodiments herein shown I have provided for the delivery of compressed air to the combustion chamber by operation of a five stage compressor of the centrifugal type. This compressor is housed in the housing 64 carried by and extending down from the lower gateway casing element 40 (see FIGURES 6 and 7, and others). This compressor includes the vertical shaft 65 which may be a downwardly extending portion of the gateway shaft 23 or secured thereto, such shaft 65 being journalled at the lower end of the housing. This shaft carries the five stages of centrifugal impellers, shown at 66, 67, 68, 69 and 70, together with suitable stator sections if desired. The bottom 71 of the housing 64 is provided with a number of air inlet openings 72 through which the air intake occurs to the lowermost and first stage of compression. The thus compressed air is delivered into the upper portion of the housing 64 and thence through the passage 73 to the lower end of the combustion chamber 56. The ignition of the combustible mixture produced in the combustion chamber by the jet or stream of fuel entering therein may be induced in various manners, some of conventional form. This will be further described hereinafter.

In FIGURE 8, which is a bottom face view of the elements taken on the non-planar section line 8—8 of FIGURE 7 and other figures, there appears the annular peripheral surface 74. This surface is, however, interrupted at the gateway 49 already explained. The surface there shown (74 in FIGURE 8) is the bottom surface of that flange element of the gateway element which reaches into the power element, as evident from FIGURE 7 and other figures. The top surface of this radial section of the gateway element is flat as also evident from FIGURE 7. The bottom surface just referred to is in the form of a broad angle truncated cone, and the central portion thereof is flat and normal to the axis of rotation of the shaft 23. Extending through the gateway element from its bottom to its top surface there are a number of port passages, 75 (see FIGURE 8). These terminate at their lower ends at the flat central portion of the gateway element. Thence they slant outwardly to the upper flat surface of such gateway element, as well shown in FIGURES 6 and 7. The lower ends of these passages lie at a radius from the axis of rotation such that during the rotation of the gateway element such lower passage ends come successively into registry with the upper end of the combustion chamber 56 to thus momentarily establish communication of such combustion chamber with such individual passages. The upper ends of such passages 75 lie at a radius from the axis of gateway rotation such that said upper ends may come successively into registry with the space contained within the power casing and below the blade 25, 26 or 27, as the case may be, which has just previously passed to a location above the peripheral portion of the gateway element. Thus, as shown in FIGURE 7 communication is momentarily established through each such registering passage 75 from the combustion chamber 56 to the space then existing between the top face of the gateway element and the bottom or trailing surface of that blade which is now above the gateway flange and retreating upwardly from such flange, such retreat being by upward rotational movement of the blade. Further explanation of these operations is as follows:

Due to the three to one ratio between the speeds of rotation of the gateway element and the power element, and the further fact that there are three power blades shown on the power element, it follows that for a rotational movement of 180 degrees of the gateway element there will be a rotational movement of only 60 degrees of the power element. Since there are three of the power blades it follows that for a 180 degree advance of the gateway element there will be an advance of only one-half of the center to center angular distance between any two successive blades of the power element. The useful expansion space for one power impulse will be in the present design 120 degrees, less the combined thickness of the gateway element 22 and the power blade 25 (or 26 or 27), the angle being measured from the center of the power shaft, and less the angular movement of the blade from the moment the edge of the passageway registers with the edge of the expansion chamber, and the passageway begins to open to allow the following blade a free passage through the gateway element 22. According, I have in FIGURE 8 shown a number of the small individual passages 75 through such gateway element, all comprised within an arc of 180 degrees of such gateway element. By this means I am enabled to ensure a continuous delivery of the hot expanding gas through the gateway element for slightly more than one-half of the angular advance between successive blades. Then, during the remaining blade movement the gateway element will have cut off and isolated the chamber then under consideration and lying between the top surface of the gateway element and the blade of action. Thus during such cut-off interval there will occur inflow expansion of the trapped medium, with corresponding enhancement of the efficiency of the operation, measured thermodynamically. Such expansion will probably be more than adiabatic and less than isothermal, in its effects, considered from the standpoint of the pressure loops of expansion.

It is now noted that although I have in FIGURE 8 shown a series of individual passages 75 through the gateway element, still such passages might be connected together into a continuous opening of arcuate embracement corresponding to the total are spanned from the leading edge of the first passage of the series to the trailing edge of the final passage of the series. However, the provision of the individual passages ensures a much stronger and stiffer gateway element construction than would be provided by the suggested arrangement.

It is also to be noted that the total arcuate span from leading edge at the beginning to trailing edge at conclusion may be either greater then or less than that produced by the illustrated embodiment.

An electrical ignition system is provided for igniting the combustible mixtures contained in the combustion chamber just prior to or at the very beginning of the registry of the through passages 75 of the gateway rotor 22 with the combustion chamber 56. Such ignition may be by a spark properly timed to ignite the compressed mixture just prior to or at the very beginning of the travel of such mixture through the ports 75, into the expansion space, or such ignition may be produced by "hot" wire arrangements of convenient operation. In such case the fuel injection should commence at the same time as the commencement of the spark ignition, the duration of the injection depending on the angle of the through passages 75 of the gateway rotor 22, and generally terminating before the connection between the combustion chamber 56 and the expansion space A, B, or C, is interrupted, further expansion of the hot gases taking place entirely in the expansion chambers.

Figure 3:
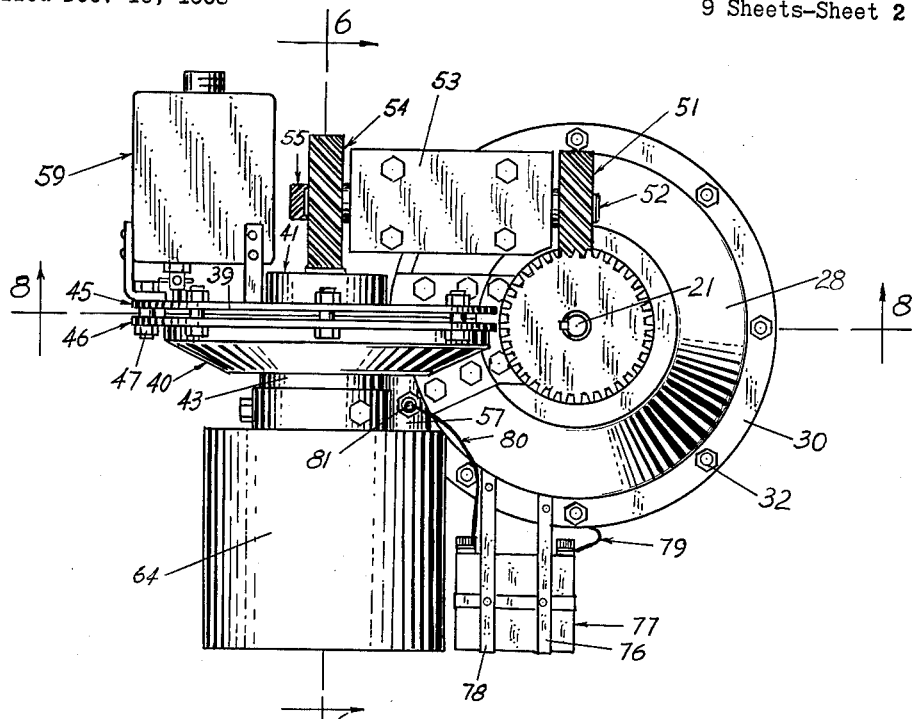
FIGURE 3 shows a rear elevation corresponding to FIGURES 1 and 2.
Figure 4:
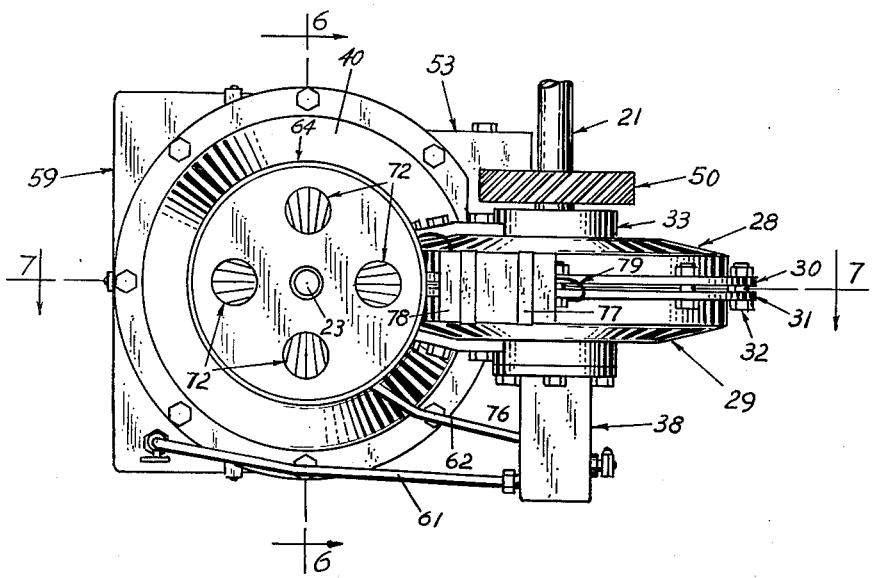
FIGURE 4 shows a bottom view of the unit of FIGURES 1, 2 and 3, looking upwardly.
Figure 5:
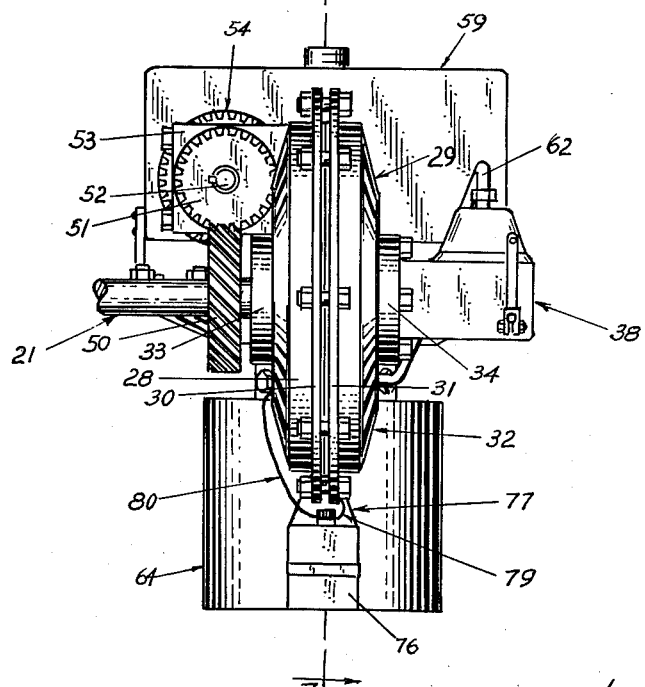
FIGURE 5 shows a right-hand elevation corresponding to FIGURES 1, 2, 3 and 4.

In FIGURES 1, 3 and 5 I have shown the battery box 76 conveniently suspended from the lower portion of the power element casing by the straps 77 and 78. This battery box may also contain equipment ancillary to the ignition system, such as condensers, etc. One side of the battery is grounded by the line 79. The other side of the system connects by the line 80 to the spark plug 81 or other ignition element, such as a "hot" wire contained in the combustion chamber 56 near the upper end thereof where delivery of the combustible is made to and through the passages 75. It should be here noted that when using such a "hot" wire arrangement the same may be continuously hot to the ignition point notwithstanding that it is located in the combustion chamber. This is because such combustion chamber contains only compressed air until, at the proper instant in each cycle a jet or spray of the liquid fuel is delivered through the orifice 58 into the upper portion of the combustion chamber, at which time the series of openings 75 has come into registry with the upper end of the combustion chamber to thus establish a connection directly to the enlarging space within the power element, beneath the upwardly moving blade. Then, when cut-off occurs by rotation of the gateway element to the proper position, further expansion of the hot gases contained within the expansion chamber will occur until a further operation occurs, as follows:

An exhaust port 82 is formed in the casing element 29 at the front side of the power element. This port provides exhaust opening from the interior of the power casing to the outside air or to a suitable passage or conduit, leading from the interior of such power casing at a point just in advance of the flange portion of the gateway element which extends into the power element casing. See FIGURES 1 and 7. Such exhaust port spans an angle of substantially 45 degrees so that as each of the expansion chambers between two of the blades comes to the location of this port sufficient time is allowed for a full exhaust action to occur before the trailing blade of such chamber closes such port. It is here noted that with the power rotor in the position shown in FIGURE 7 the three expansion chamber sections of the rotor occupy the following positions; Chamber A is divided, its leading blade being above the rotary gateway element and its trailing blade below such rotary gateway element, such chamber being thus divided into A' and A² as indicated. Its portion A' now comprises an expanding chamber since its top is defined by the rising blade 25 and its bottom is defined by the now intersecting but perforated portion of the rotary gateway element. During this phase of the operation gas is filling this chamber A', and such filling will continue for about a total of 60 degrees (being about 50 degrees beyond the position indicated in FIGURE 7). Thereafter, and before the gateway element comes around to its gate registry position with the power element, expansion of the burned and hot gases contained in chamber section A' will continue. It is noted that during this expansion phase for chamber A' the rotary gateway element has completed substantially 250 degrees of rotation from its position as shown in FIGURE 8, so that the gateway was closed during the expansion phase of such chamber A.

While the foregoing operations were proceeding with respect to chamber A, chambers B and C were both completely sealed off as shown in FIGURE 7, until such time as the blade 27 comes around to position to uncover the exhaust opening 82. Until that uncovering occurs both of these chambers B and C are dead, and are merely carrying with them the expanded and somewhat cooled gases which they carried at termination of their respective expansion phases. It is thus evident that by provision of a second gateway element, located diametrically opposite to that shown in the various figures so far described, a much more efficient and thus a much higher weight efficiency construction of unit may be produced, practically doubling the possible power output for a unit of given size with the exception of the additional width required to accommodate the second gateway element. Such a double gateway element arrangement is shown in FIGURE 9, to which attention is now invited:

In FIGURE 9, which is a view similar to that of FIGURE 7 as respects the general arrangement of parts and elements, there is provided the three blade rotor element, as before, and the left-hand gateway element is substantially the same as that previously described. In the present case, however, I have provided two exhaust openings or ports numbered 82 and 82ª, respectively. The port 82 serves the operations instituted by the left-hand gateway element. A second, right-hand gateway element V has been added to the right-hand side of the power rotor element, but it is conveniently inverted as shown in FIGURE 9. Both of the gateway elements and associated parts may be fed with fuel from the common fuel tank 59ª. Since the additional elements thus provided in this dual arrangement are substantially the same as corresponding elements already described it is not deemed necessary to repeat the full descriptions. There are, however, certain functional operations which have been provided for in this dual arrangement, so the following additional description is proper at this point;

Study of the relationships of the two gateway elements shows that the timing of the right-hand gateway rotor must be 180 degrees from phase with respect to the timing of the left-hand gateway rotor, both with respect to the power rotor. This fact is apparent since the provision of an uneven number (three) blades serving both gateway elements (or served by such gateway elements) brings a blade to the gateway position of the right-hand gateway rotor at the same time that intake of combustible mixture is being produced for the left-hand side of the unit. Correspondingly, at the time a blade is moving through the gateway of the right-hand gateway element the other two blades are equidistant above and below the left-hand gateway element whose gateway has then moved half way around from registry with the power rotor. Thus, although the ratio of three to one in rotary velocity must be maintained in this dual arrangement, as between the gateway rotor speeds and the power rotor speed, still the phasing must be reversed as between the two gateway rotors.

Next, it will be noted that with this dual arrangement the exhaust port 82 serves the exhaust of expanded gases coming from the left-hand gateway side of the unit, whereas the exhaust port 82$^a$ serves the exhaust of expanded gases which come from the right-hand side of the unit. It also appears that there are no "dead" expansion chambers of the power rotor with this dual arrangement. This is due to the fact that by locating each exhaust port directly beyond the positions of the blade which has been under pressure, exhaust delivery can take place from the chamber just behind such blade without waiting for such blade to travel substantially 180 degrees further around the power rotor casing before reaching its exhaust port. Thus it is possible to make provision for the introduction of the second gateway into the ensemble, substantially doubling the power output without enlargement of the power rotor element and its casing. This doubling of power output is obtained due to the fact that two power impulses are now produced where before only a single power impulses was produced; in other words, with the arrangement of FIGURES 1 to 8, inclusive, there are produced three power impulses per revolution of the power rotor—in the arrangement of FIGURE 9 there are produced six power impulses per revolution of the power rotor. Thus, not only is the power output for a unit of specified size of power rotor element doubled, but this benefit is accompanied by a doubling of the frequency of the power impulses, each such added power impulses being of the same energy output as in the case with the previously described single sided unit. Such doubling of frequency of power impulses is also gained under conditions of torque production which are favorable to avoidance of dynamic unbalance, and thus under conditions favorable to smooth running, even at very high rotary speeds.

The following further explanations respecting the firing of the combustible mixture within the expansion chamber are now in order:

It is evident that when the firing element (such as a "hot" wire or spark plug) is located within the upper portion of the chamber 56 and even directly below the bottom face of the gateway element 22, such firing must occur just prior to or at the very beginning of registry of the passages 75 with the chamber 56, establishing communication between the chamber 56 and the expanding chamber of the power rotor. This is desirable because the flame of the ignited highly compressed air-fuel mixture travels at a very high feet/sec. speed, the hot expanding gases filling the space between the gateway element 22 and the power blade 25, 26 or 27, as the case may be, and exercising much higher pressure on said power blades than would have been the case had ignition been produced at any later stage in the operation of the unit. In this connection it is also noted that since the compressed air supplied by the centrifugal compressor or other source of supply is free of combustible medium until the chamber 56 is reached there is no possibility of "back-firing" from such chamber into the compressor unit or other source of compressed air supply. In fact, the initiation of combustion will only occur at or about the level of the "hot" wire or spark plug igniting element.

However, in some cases it will be found desirable to provide for ignition directly within the expanding chamber and above the top face of the gateway element 22 after such element has rotated to the position for final cut-off of communication between the chamber 56 and the expanding space within the power rotor. Therefore, I have also in FIGURE 7 shown the spark plug 83 extended through the casing element 29 of the power element at a location to enable firing the mixture with the expanding space of the power rotor after cut-off of the inlet to such expanding space has been produced by advance of the gateway element 22, so as to ensure production of maximum temperature within such expanding space during the expansion occuring therein. Likewise I have shown the spark plugs 84 and 84$^a$ in the wall of the casing of the power element illustrated in FIGURE 9. Of course all such spark plugs should be of design and size and be so entered through the respective casing elements, that no part of any spark plug would project into the paths of travel of the rotor blades. Also, if fuel injection is used, the jet nozzle should in such case preferably be located in the wall of the expanding space.

It is also noted that in FIGURES 7 and 9 I have shown the inlet passage 73 from the upper portion of the compressor to the chamber 56 as extending from a location near the shaft and hub of the compressor rotor to such chamber 56. Also, that the upper portion of the compressor rotor or on a separate element carried by the compressor shaft I have shown the eccentric valve element 85. This element has the larger radius portion of size to seal against the inner or inlet end of the passage 73 and so phased that such larger radius portion will seal such passage in register therewith. (See FIGURES 12 and 13.)

In FIGURES 7 and 9 I have shown such element 85 as sealing the inner end of the conduit 73 while one of the passages 75 of the gateway element is in communication with the space A' below the rotor blade 25. Under such conditions the "hot" wire or spark plug may be placed in the chamber 56, and the fuel pump (if jet fuel delivery is used) may be timed to produce the jet delivery into such chamber 56 while the conduit 75 is closed by the valve element 85, but while the chamber 56 is in communication, through such passage 75, with the space below the blade 25, or 26 or 27, as the case may be. Thus the firing in the power rotor expansion space may be produced by a "hot" wire or spark plug located in the chamber 56. With such an arrangement the timing of the functions should be such that jet introduction or spark plug ignition shall occur only just prior to the registry of the first one of the passages 75 with the chamber 56 and thus with the space within the power rotor. With such operation the spark plugs 83 (or 84 and 84$^a$) may be eliminated if desired.

It is pointed out that the units herein disclosed, whether of the one-sided gateway arrangement of FIGURES 1 to 8, inclusive, or of FIGURES 10 and 11, presently to be described or of the dual-sided or multiple sided arrangement of FIGURE 9, is functionally reversible—that is, it can be used and operated, with minor changes or omissions, as a high-speed, positive displacement, non-reciprocating valve, compressor or pump. In this connection the following comments are pertinent:

By way of illustration of the above stated reversibility the unit shown in FIGURES 1 to 8, inclusive, or FIGURE 9, will operate as a compressor or pump in either direction of rotation of such unit, and with equal efficiency, by using either the exhaust ports 82 or 82$^a$ of such units, or the gateway ports 75, or all ports of the power rotor as inlets or outlets. It is noted, however, that when using the unit for pumping non-compressible fluid such as water or other liquid, the parts must be so proportioned as to avoid hydraulic lock, as otherwise the unit will stall or be damaged due to such non-compressibility. Thus, in the case of running the unit counterclockwise (when viewed as in FIGURE 7), the arc subtended by all of the ports 75 of the gateway element rotor 22 should be increased to provide an arcuate span coinciding exactly with the closing of the gateway opening 49; otherwise non-compressible liquid when so pumped would be subjected to such hydraulic lock. This condition would not, however, obtain when using the unit as a clockwise rotating pump. This is true since, in case of non-exact phasing relation between the openings and closings of ports and blade movements, and when pumping non-compressible liquids, some cavitation may occur between the gateway element and the blade 25, 26 or 27, as the case may be, after closing of communication between the ports 75 and the chamber 56. Any vacuum produced by such cavitation would be promptly relieved upon the opening of the gateway passage 49. In case of running the unit as a pumping device, either clockwise or counterclockwise, the lengths of the exhaust ports 82 (and/or 82$^a$) should be reduced to probably not over one-fourth of the illustrated lengths, or less than such amount, with proportional widening of such ports, if necessary, to restore their effective opening areas to a sufficient size.

When using any of the herein illustrated units as a compressor (for compressible medium such as air or gas) it is not necessary to ensure exact correct phasing of the openings and closing of various ports, since the very compressible nature of such medium avoids the production of "hydraulic lock" in any case. However, it would, even in the case of compressing such compressible media, be desirable to so design the unit that close tolerances of port openings and closings would occur especially when high compression ratios were desired.

Reference is now invited to FIGURES 10 and 11 in which I have shown a modified embodiment of my present invention in which the functions of the gateway operations to pass the rotor blades of the power element with space seal beneath such blades after such passage, and of valving for control of introduction of the combustion constituents into the working expanding space of the power rotor have been divorced from each other and are separately provided for. In this embodiment the gateway element thus performs the gateway functions to which it is directed, without any limitation of design imposed by need of also providing for the various valving functions. It is, however, noted that in the embodiment now to be described, the function of valving the supply of compressed air or other gas into the compression and/or combustion chamber is conveniently performed by such gateway element, but the valving functions between the compression and/or combustion chamber and the power rotor spaces are divorced from such gateway element. This construction is as follows:

The power rotor element 86 with its blades 25$^a$, 26$^a$ and 27$^a$ (25$^a$ not showing in FIGURE 11 in which only a portion of the front casing elements 29$^a$ is broken away to reveal the interior of such power element) is provided with laterally or axially extending passages or conduits such as shown at 87 in FIGURE 11, corresponding to the gas expansion spaces between the three blades. These passages conveniently extend through the hub portion 24$^a$ or 86 in FIGURE 11 to the front face of the power rotor element, their inner ends being located in the floors of the several spaces between the successive blades, and such passages then slanting towards the power rotor axis with forward progression. The front or terminal ends of these passages are normally sealed by engagement of the front hub portion of the rotor facially against the inside face of the front casing element 29$^a$ in gas tight fashion.

The compression and/or combustion chamber 57$^a$ is placed in communication with the inside face of the front casing element 29$^a$ at a location just above the plane of intersection of the gateway flange with the power rotor, being also just above the said flange when the power rotor blade has been passed through the gateway and below the face of the blade which has just been passed through such gateway. Thus the communication of such compression and/or combustion chamber 57$^a$ is established with the inside surface of the front casing element 29$^a$ at a location where the combustible mixture or component will be delivered into what is now to be a working space of the power rotor. Accordingly, such chamber 57$^a$ is conveniently set into the opening 87 of the front casing element 29$^a$. The conduit 88 supplies the compressed air delivered by the centrifugal compressor unit 64$^a$ under control of the valve 85 (see FIGURE 7) in proper timing as already explained, such conduit 88 being connected into such chamber 57$^a$. Also, the tube 62$^a$ delivers the liquid fuel to a spray nozzle in such chamber 57$^a$ in accordance with conventional practice, either as a continuous stream or as jets, as already explained herein. The ignition may be instituted in such chamber 57$^a$ in desired manner. In FIGURE 11 I have shown the "hot" wire arrangement for performing this function, the same being legended 89.

Various details of this modification of FIGURES 10 and 11, such as the fuel pump, the synchronizing drive between the power rotor shaft and the gateway rotor shaft, and others, do not require detailed description since such elements and devices have been fully described hereinelsewhere.

The valving arrangements disclosed in FIGURES 10 and 11 may also be incorporated in multiple gateway arrangements, such as that shown in FIGURE 9, wherein there are incorporated either two or more of the gateway elements serving the one power rotor element.

I have previously stated that one feature and object of the invention concerns itself with the provision of means to effect necessary cooling of parts, particularly the rotor and its blades, and also the edge portion of the valving disk element during running, when the motive power comprises the hot gases of internal combustion. Any suitable means may be provided to effect this cooling function. By way of illustration only, and not as a limitation, except as I may limit myself in the claims to follow, the cooling may be effected as follows:

In FIGURE 7 I have shown the passage or conduit 89 extending axially within the power rotor shaft. This passage may be connected to a suitable stationary conduit for supply of cooling air or other coolant, by a conventional form of packed joint, such for example as packed pipe joints produced by the Barco Manufacturing Company of Barrington, Illinois. Within the hub portion of the power rotor element there are provided the radially extending passages 90, 91 and 92 which reach to the spaces between the successive blades 25, 26 and 27, it being noted from examination of FIGURE 7 that each such passage terminates close to the leading face of the corresponding blade. Thus cooling air or water or other coolant introduced through these passages will enter the space between the two blades located before and behind each such passage 90, 91 or 92. Here it is noted that such entry will not affect the proper supply of combustible mixture to such space for the following reason;

Considering, first, the space A' contained between the blade 25 and the upper surface of the gateway rotor flange; the passage 92 is cut off from communication with such space by the interposition of the flange of the gateway rotor, and as clockwise rotation continues that body of coolant contained in the space between the rotor blades 27 and 25 is continuously swept, by the flange of the gateway rotor, through the discharge opening 82, so that by the time that the blade 27 comes through the gateway of the gateway rotor none of the coolant previously contained in the space between such blades 27 and 25 can reach the space above the gateway rotor flange. A similar sweeping action will also occur as each blade proceeds towards the gateway rotor flange and then through the gateway of such element to the space above the flange. Since the expansion of the gases for work extraction from such gases in each of the spaces between a blade and the edge flange of the valving element has substantially completed prior to movement of the passage corresponding to such space through the gateway the full work expansion and conversion to torque of the power rotor has been completed prior to such passage of such radial passage to a location above the flange of the gateway rotor flange. Then, as soon as the next blade has come through the gateway flange opening the passage in advance of such blade is sealed off from the working space and thus does not interfere with the desired pressure gas containment and expansion during the working stroke.

If water be injected through the passages 90, 91 and 92 in the foregoing manner as the coolant it is evident that only a small jet of such water, delivering only a small amount of water into each space at each operation, will suffice to produce a large cooling action, due to the large latent heat of evaporation of water. The water vapor produced by evaporation of such so-injected water will of course pass out from the delivery opening 82 along with the exhausted products of combustion.

Reference to FIGURE 7 also shows the openings 93 extending through the power rotor casing at a location just below the location of intersection of the path of rotary travel of the gateway flange element with such casing. Suitable fluid coolant may be introduced through these openings and into contact with the under face of the gateway flange as it travels through the power element casing. Thus coolant will come into direct contact with the gateway flange surface opposite to the location where such flange is being subjected to the intense heat of the combustion of the gases contained in the expanding spaces of the rotor. As each blade of the power rotor approaches the thus cooled under surface of the gateway flange the used coolant will be expelled through the discharge opening 82 of the power element casing. Since the flange portion of the gateway rotor is comparatively thin good heat transmission and conduction therethrough will occur, to thus ensure desired cooling of such flange portion. The coolant may be supplied through the ports 93 in any convenient manner. Thus, in FIGURES 16 and 17 I have shown the short ducts or tubes 93a connecting said ports to the compressor element 64 by which air under compression is thus supplied to said ports 93. This form of coolant supply is shown only by way of example.

I claim:

1. In a device of the class described, the combination of a power rotor element having a hub portion, a power shaft in connection with said hub portion, means to journal said shaft for rotation on a power rotor axis, at least one torque transferring blade connected to and extending in substantially radial direction from said hub portion, the medial portion of said blade rotating in a plane normal to the power rotor axis of rotation, a gateway rotor element including a gateway portion of circular generally disk shape and having a hub portion, a gateway rotor shaft in connection with said gateway rotor element hub portion, means to journal said gateway rotor shaft for rotation on an axis lying in a plane parallel to and laterally displaced from a plane which contains the axis of rotation of the power rotor element, the disk shaped portion of the gateway rotor element lying in a plane normal to the axis of rotation of said gateway rotor element and said plane intersecting the path of travel of the blade of the power rotor element and the peripheral portion of the disk shaped portion of the gateway rotor element traveling in edge contact gas sealing engagement with the hub portion of the power rotor element, said disk shaped gateway portion being provided with at least one gateway of size and contour to accommodate travel of the blade through said gateway when said gateway portion is in angular position to register the gateway with the path of travel of the blade, means to rotatably connect the power rotor element and the gateway rotor element together for synchronous rotation of said elements in phase relation such that the gateway and the blade are simultaneously in registry with each other at least once during each rotation of the power rotor element and the gateway rotor element, together with a casing enclosing the power rotor element and of size and contour to establish a circular passage within which the blade travels in substantially gas tight fashion, said casing being formed to receive the disk shaped gateway rotor element at the location of intersection of said disk shaped element with the path of travel of the blade in substantially gas tight sealing fashion of the casing with said gateway rotor element, the blade of the power rotor element approaching the disk shaped gateway element and passing through the gateway of such element and retreating from such element during synchronous rotation of said elements to produce an enclosed space of changing volume between the blade and the gateway element, together with fluid supply and delivery conduits, at least one such conduit being in communication with such enclosed space, valve means in said conduit, operative connections between said valve means and the rotary elements effective to control the opening and closing of such conduit for controlling fluid transfer through such conduit, means to deliver combustible fluid to the fluid supply conduit, means to produce combustion of such combustion fluid with production of hot gases within said enclosed space of changing volume, together with means to supply coolant into direct contact with the leading face of the blade.

2. A device as defined in claim 1, wherein said means to supply coolant into direct contact with said leading face of the blade comprises a radially extending passage through the hub portion of the power rotor element, an axially extending passage in the power shaft in communication with said radially extending passage, and means to supply the coolant to said axially extending passage.

3. In a device of the class described, the combination of a power rotor element having a hub portion, a power shaft in connection with said hub portion, means to journal said shaft for rotation on a power rotor axis, at least one torque transferring blade connected to and extending in substantially radial direction from said hub portion, the medial portion of said blade rotating in a plane normal to the power rotor axis of rotation, a gateway rotor element including a gateway portion of circular generally disk shape and having a hub portion, a gateway rotor shaft in connection with said gateway rotor element hub portion, means to journal said gateway rotor shaft for rotation on an axis lying in a plane parallel to and laterally displaced from a plane which contains the axis of rotation of the power rotor element, the disk shaped portion of the gateway rotor element lying in a plane normal to the axis of rotation of said gateway rotor element and said plane intersecting the path of travel of the blade of the power rotor element and the peripheral portion of the disk shaped portion of the gateway rotor element travelling in edge contact gas sealing engagement with the hub portion of the power rotor element, said disk shaped gateway portion being provided with at least one gateway of size and contour to accommodate travel of the blade through said gateway when said gateway portion is in angular position to register the gateway with the path of travel of the blade, means to rotatably connect the power rotor element and the gateway rotor element together for synchronous rotation of said elements in phase relation such that the gateway and the blade are simultaneously in registery with each other at least once during each rotation of the power rotor element and the gateway rotor element, together with a casing enclosing the power rotor element and of size and contour to establish a circular passage within which the blade travels in substantially gas tight fashion, said casing being formed to receive the disk shaped gateway rotor element at the location of intersection of said disk shaped element with the path of travel of the blade in substantially gas tight sealing fashion of the casing with said gateway rotor element, the blade of the power rotor element approaching the disk shaped gateway element and passing through the gateway of such element and retreating from such element during synchronous rotation of said elements to produce an enclosed space of changing volume between the blade and the gateway element, together with fluid supply and delivery conduits, at least one such conduit being in communication with such enclosed space, valve means in said conduit, operative connections between said valve means and the rotary elements effective to control the opening and closing of such conduit for controlling fluid transfer through such conduit, means to deliver combustible fluid to the fluid supply conduit, means to produce combustion of such combustile fluid with production of hot gases within said enclosed space of changing volume, together with means to supply coolant into direct contact with the edge portion of the disk shaped gateway element at the face of said disk shaped element opposite to the enclosed space which is of changing volume.

4. A device as defined in claim 3, wherein said means to supply coolant into direct contact with the edge portion of the disk shaped gateway element at the face of said disk shaped element opposite to the enclosed space which is of changing volume comprises at least one port in the power rotor casing in proximity to said face of said disk shaped element, together with means to supply coolant through said port to said location.

5. In a device of the class described, the combination of a power rotor element having a hub portion, a power shaft in connection with said hub portion, means to journal said shaft for rotation on a power rotor axis, at least one torque transferring blade connected to and extending in substantially radial direction from said hub portion, the medial portion of said blade rotating in a path of travel normal to the power rotor axis of rotation, a gateway rotor element including a gateway portion of circular generally disk shape and having a hub portion, a gateway rotor shaft in connection with said gateway rotor element hub portion, means to journal said gateway rotor shaft for rotation on an axis lying in a plane parallel to and laterally displaced from a plane which contains the axis of rotation of the power rotor element, the disk shaped portion of the gateway rotor element lying in a plane normal to the axis of rotation of said gateway rotor element and said plane intersecting the path of travel of the blade of the power rotor element and the peripheral portion of the disk shaped portion of the gateway rotor element travelling in edge contact gas sealing engagement with the hub portion of the power rotor element, said disk shaped gateway portion being provided with at least one gateway of size and contour to accommodate travel of the blade through said gateway when said gateway portion is in a first defined angular position to register the gateway with the path of travel of the blade, means to rotatably connect the power rotor element and the gateway rotor element together for synchronous rotation of said elements in phase relation such that the gateway and the blade are simultaneously in registry with each other at said first defined position at least once during each rotation of the power rotor element and the gateway rotor element, together with a casing enclosing the power rotor element and of size and contour to establish a circular passage within which the blade travels in substantially gas tight fashion, said casing being formed to receive the disk shaped gateway rotor element at the location of intersection of said disk shaped element with the path of travel of the blade in substantially gas tight sealing fashion of the casing with the gateway rotor element, there being at least one passage through the disk shaped portion of the gateway rotor element, said passage having its inlet end located outside of the circular blade receiving passage, said disk passage having its delivery end located at a radius from the axis of rotation of said gateway rotor element greater than the distance between the axes of rotation of the power rotor element and the gateway rotor element reduced by the maximum radius of the circular blade receiving passage, the means which connects the power rotor element and the gateway rotor element together being so constituted that the delivery end of said passage communicates with the circular blade receiving passage substantially synchronously with completion of the travel of the blade through the gateway in the direction of blade travel, there being a port in the gateway housing in position for registry of the aforesaid passage with said port while the delivery end of said passage is in communication with the annular blade receiving passage, a combustion chamber in communication with said port, an inlet connection to said combustion chamber, means to supply compressed air to said inlet connection, valve means in said inlet connection, operative connections between the gateway rotor shaft and the valve means constituted to open and close said valve means cyclically corresponding to cycles of rotation of the power rotor shaft and the gateway rotor shaft and with the valve means in closed position when the passage of the gateway rotor element is in registry with the port of the gateway housing, together with means to deliver combustible fluid into the combustion chamber, and means to ignite said combustible fluid when the passage of the gateway disk is in registry with the port of the gateway casing as aforesaid.

6. A structure as defined in claim 5, wherein there is an exhaust port in the blade casing communicating with the annular blade passage, the blade moving over said exhaust port from a position in advance of said port to a position beyond said port during the cyclic operation, and said exhaust port being located at position such that the blade is in advance of said port during an interval of blade travel between movement of the blade through the gateway of the disk and movement of the gateway disk to position of non-registry of the disk passage with the gateway housing port and closure of said gateway housing port.

7. A structure as defined in claim 6 wherein said exhaust port is located at a position such that the volume of the space within the annular blade passage between the gateway disk and the blade is greater when the blade moves over said exhaust port than the volume of said space at the cyclic position of closure of the gateway housing port by rotational movement of the gateway disk, with corresponding expansion of the volume of the annular blade passage space between the gateway disk and the blade prior to movement of the blade across the exhaust port.

8. In a device of the class described, the combination of a power rotor element having a hub portion, a power shaft in connection with said hub portion, means to journal said shaft for rotation on a power rotor axis, at least one torque transmitting blade connected to and extending in substantially radial direction from said hub portion, the medial portion of said blade rotating in a path of travel normal to the power rotor axis of rotation, a gateway rotor element including a gateway portion of circular generally disk shape having a hub portion, a gateway rotor shaft in connection with said gateway rotor element hub portion, means to journal said gateway rotor shaft for rotation on an axis lying in a plane parallel to and laterally displaced from a plane which contains the axis of rotation of the power rotor element, the disk shaped portion of the gateway rotor element lying in a plane normal to the axis of rotation of said gateway rotor element and said plane intersecting the path of travel of the blade of the power rotor element and the peripheral portion of the disk shaped portion of the gateway rotor element travelling in edge contact gas sealing engagement with the hub portion of the power rotor element, said disk shaped gateway portion being provided with at least one gateway of size and contour to accommodate travel of the blade through said gateway when said gateway portion is in a first defined angular position to register the gateway with the path of travel of the blade, means to rotatably connect the power rotor element and the gateway rotor element together for synchronous rotation of said elements in phase relation such that the gateway and the blade are simultaneously in registry with each other at said first defined position at least once during each rotation of the power rotor element and the gateway rotor element, together with a casing enclosing the power rotor element and of size and contour to establish a circular passage within which the blade travels in substantially gas tight fashion, said casing being formed to receive the disk shaped gateway rotor element at the location of intersection of said disk shaped element with the path of travel of the blade in substantially gas tight sealing fashion of the casing with the gateway rotor element, an exhaust port in the blade casing communicating with the annular blade passage, said blade moving over said exhaust port from a position in advance of said port to position beyond said port during cyclic operation of said parts, and said exhaust port being located at position such that the blade is in advance of said port during an interval of blade travel between movement of the blade through the gateway of the disk and movement of the gateway disk to position of non-registry of the disk gateway to a position beyond the location of registry of such gateway disk with the annular blade passage, during which blade travel movement the annular blade travel space is of expanding size between the gateway disk and such blade, together with a combustion chamber, an inlet connection to said combustion chamber, means to supply compressed air to said inlet connection, a combustible delivery passage between the combustion chamber and the annular blade passage of the power rotor element, and means to cyclically establish connection of said passage to the space of expanding size aforesaid between the disk of the gateway element and the blade, and to seal said combustible delivery passage at a location between the combustion chamber and the annular blade passage prior to movement of the blade to the location of the exhaust port.

9. A structure as defined in claim 8, together with valve means in the inlet connection to the combustion chamber, means to drive said valve means cyclically between open and closed connection positions harmoniously with the rotational movements of the power shaft and the blade, with the valve means in closed position during an interval between movement of the blade to the location of the exhaust port and movement of the blade through the gateway, and with the valve means in open position during an interval between movement of the blade through the gateway to a position in advance of registry of such blade with the exhaust port.

10. A structure as defined in claim 9, together with means to deliver combustible fluid into the combustion chamber and means to ignite said combustible fluid when the valve means which is in the inlet connection to said combustion chamber is in closed position and the combustible delivery passage between the combustion chamber and the annular blade passage establishes connection between said combustion chamber and said annular blade passage.

11. A structure as defined in claim 8, wherein the combustible delivery passage between the combustible chamber and the annular blade passage comprises an inlet port in a side wall of the annular blade passage at a location in proximity to the plane of intersection of the path of travel of the blade of the power rotor element and the peripheral portion of the disk shaped portion of the gate element and between said location of intersection and the location of the exhaust port, together with a passage element in the hub of the power rotor element, having an inlet end opening in location radially displaced from the axis of rotation of the power rotor element to register cyclically with the inlet port in the side wall of the annular blade passage substantially at commencement of angular movement of the blade from the disk edge portion of the gateway element, and having an outlet end in communication with the annular blade passage at a location in proximity to the trailing face of the blade.

12. A structure as defined in claim 11, wherein the inlet port which is in a side wall of the annular passage of the annular blade housing is located at a radius from the axis of rotation of the power rotor element less than the radius of the inner surface of the annular blade passage measured from said axis, and wherein the inlet port which is in the side wall of the annular blade passage is at the same radius measured from the axis of rotation of the power rotor element as the radius of the inlet end opening of the passage element in the hub of the power rotor element.

13. In a device of the class described, the combination of a power rotor element having a hub portion, a power shaft in connection with said hub portion, means to journal said shaft for rotation on a power rotor axis, at least one torque transferring blade connected to and extending in substantially radial direction from said hub portion, the medial portion of said blade rotating in a path of travel normal to the power rotor axis of rotation, a gateway rotor element including a gateway portion of circular generally disk shape and having a hub portion, a gateway rotor shaft in connection with said gateway rotor element hub portion, means to journal said gateway rotor shaft for rotation on an axis lying in a plane parallel to and laterally displaced from a plane which contains the axis of rotation of the power rotor element, the disk shaped portion of the gateway rotor element lying in a plane normal to the axis of rotation of said gateway rotor element and said plane intersecting the path of travel of the blade of the power rotor element and the peripheral portion of the disk shaped portion of the gateway rotor element travelling in edge contact gas sealing engagement with the hub portion of the power rotor element, said disk shaped gateway portion being provided with at least one gateway of size and contour to accommodate travel of the blade through said gateway when said gateway portion is in a first defined angular position to register the gateway with the path of travel of the blade, means to rotatably connect the power rotor element and the gateway rotor element together for synchronous rotation of said elements in phase relation such that the gateway and the blade are simultaneously in registry with each other at said first defined position at least once during each rotation of the power rotor element and the gateway rotor element, together with a casing enclosing the power rotor element and of size and contour to establish a circular passage within which the blade travels in substantially gas tight fashion, said casing being formed to receive the disk shaped gateway rotor element at the location of intersection of said disk shaped element with the path of travel of the blade in substantially gas tight sealing fashion of the casing with the gateway rotor element, together with means to supply coolant into direct contact with the leading face of the power rotor blade.

14. A structure as defined in claim 13, wherein said coolant comprises a gaseous medium.

15. A structure as defined in claim 13, wherein said coolant comprises a liquid medium.

16. A structure as defined in claim 13, wherein said coolant comprises water.

17. A structure as defined in claim 13, wherein said means to supply coolant into direct contact with the leading face of the power rotor blade comprises means acting continuously to effect such supply of the coolant.

18. A structure as defined in claim 13, wherein the means to supply the coolant into direct contact with the leading face of the power rotor blade comprises a passageway extending axially of the power rotor shaft, together with a radially extending delivery passage extending from said axial passageway to a location in proximity to the leading face of the blade, and means to deliver the coolant through said axially extending passageway.

19. In a device of the class described, the combination of a power rotor element having a hub portion, a power shaft in connection with said hub portion, means to journal said shaft for rotation on a power rotor axis, at least one torque transferring blade connected to and extending in substantially radial direction from said hub portion, the medial portion of said blade rotating in a path of travel normal to the power rotor axis of rotation, a gateway rotor element including a gateway portion of circular generally disk shape and having a hub portion, a gateway rotor shaft in connection with said gateway rotor element hub portion, means to journal said gateway rotor shaft for rotation on an axis lying in a plane parallel to and laterally displaced from a plane which contains the axis of rotation of the power rotor element, the disk shaped portion of the gateway rotor element lying in a plane normal to the axis of rotation of said gateway rotor element and said plane intersecting the path of travel of the blade of the power rotor element and the peripheral portion of the disk shaped portion of the gateway rotor element travelling in edge contact gas sealing engagement with the hub portion of the power rotor element, said disk shaped gateway portion being provided with at least one gateway of size and contour to accommodate travel of the blade through said gateway when said gateway portion is in a first defined angular position to register the gateway with the path of travel of the blade, means to rotatably connect the power rotor element and the gateway rotor element together for synchronous rotation of said elements in phase relation such that the gateway and the blade are simultaneously in registry with each other at said first defined position at least once during each rotation of the power rotor element and the gateway rotor element, together with a casing enclosing the power rotor element and of size and contour to establish a circular passage within which the blade travels in substantially gas tight fashion, said casing being formed to receive the disk shaped gateway rotor element at the location of intersection of said disk shaped element with the path of travel of the blade in substantially gas tight sealing fashion of the casing with the gateway rotor element, together with means to supply coolant into direct contact with the edge portion of the gateway element substantially at the location of intersection of said disk shaped element with the path of travel of the blade.

20. A structure as defined in claim 19, wherein said coolant is supplied to said location within the casing.

21. A structure as defined in claim 20, wherein said coolant is supplied to the trailing face of the blade at said location.

22. A structure as defined in claim 19, wherein the means to supply the coolant into direct contact with the edge portion of the gateway element includes a port in the power rotor casing in communication with the circular passage wherein the blade travels at a location in proximity to the intersection of the disk element with the path of travel of the blade, and means to supply the coolant through said port into said circular passage.

23. A structure as defined in claim 22, wherein said port communicates with the circular passage at a location in proximity to the face of the disk shaped element towards which face the blade approaches during power rotor rotation.

24. A structure as defined in claim 19, wherein said coolant comprises a gaseous fluid.

25. A structure as defined in claim 19, wherein said coolant comprises a liquid.

References Cited in the file of this patent

UNITED STATES PATENTS

| | | |
|---|---|---|
| 757,300 | Hangl | Apr. 12, 1904 |
| 928,506 | Driggs | July 20, 1909 |
| 1,246,875 | Carpenter | Nov. 20, 1917 |
| 1,284,768 | Powell | Nov. 12, 1918 |
| 1,332,468 | Henig et al. | Mar. 2, 1920 |
| 1,720,098 | Shreffler et al. | July 9, 1929 |

FOREIGN PATENTS

| | | |
|---|---|---|
| 545,918 | France | Aug. 4, 1922 |
| 563,981 | France | Oct. 10, 1923 |
| 53,606 | Norway | Feb. 26, 1934 |
| 624,728 | Germany | Jan. 27, 1936 |
| 288,545 | Switzerland | May 16, 1953 |